United States Patent

Kashioka et al.

[11] Patent Number: 5,921,367
[45] Date of Patent: Jul. 13, 1999

[54] SAFETY DEVICE FOR A KNEADING MACHINE USING ROLLS

[75] Inventors: Tohru Kashioka, Amagasaki; Yasuyuki Nishimura, Arida; Shogo Tanno, Arida; Katsuya Okamoto, Arida, all of Japan

[73] Assignee: Mitsubishi Cable Industries, Ltd., Hyogo-ken, Japan

[21] Appl. No.: 08/805,731

[22] Filed: Feb. 25, 1997

[30] Foreign Application Priority Data

Mar. 1, 1996 [JP] Japan ................................. 8-071259
Jul. 17, 1996 [JP] Japan ................................. 8-207936

[51] Int. Cl.⁶ ................................................. G08B 29/00
[52] U.S. Cl. ............................................................. 192/130
[58] Field of Search ............................... 192/130, 131 R

[56] References Cited

U.S. PATENT DOCUMENTS

| | | |
|---|---|---|
| 2,913,581 | 11/1959 | Simonton et al. . |
| 2,963,627 | 12/1960 | Buchsbaum ........................ 192/130 X |
| 3,109,094 | 10/1963 | Marshall et al. . |
| 3,840,224 | 10/1974 | Zawiski ............................... 192/130 X |
| 3,953,770 | 4/1976 | Hayashi ............................... 192/130 X |
| 4,070,940 | 1/1978 | McDaniel et al. ................... 192/130 X |
| 4,357,820 | 11/1982 | Blanchard ............................ 192/130 X |
| 4,532,501 | 7/1985 | Hoffman .............................. 192/130 X |
| 4,775,913 | 10/1988 | Ekblad . |

FOREIGN PATENT DOCUMENTS

| | | |
|---|---|---|
| 0 544 239 A2 | 6/1993 | European Pat. Off. . |
| 39 37 684 A1 | 5/1991 | Germany . |
| 40 36 465 A1 | 5/1991 | Germany . |
| 59-012742 | 1/1984 | Japan . |
| WO 86/06816 | 11/1986 | WIPO . |

*Primary Examiner*—Rodney H. Bonck
*Attorney, Agent, or Firm*—Thelen Reid & Priest LLP

[57] ABSTRACT

A safety device detects when a worker's hand enters a hazardous region between rollers of a kneading machine, and stops rotation of the rolls to prevent an accident. Each time the rollers are stopped, the orientation of photoelectric sensors is switched from the vicinity of the gap between the two rollers to a test reflection member, and the quantity of received light is compared to a predetermined value, to prevent workers form starting work without knowing a fault or accident has happened. More specifically, a bar electrode of an electrostatic capacitance sensor is disposed above and near the gap between the two rollers, for detecting a physical quantity that is changed by entry of a worker's hand. When the electrostatic capacitance detected by the sensor exceeds a predetermined value, a judging circuit supplies a control signal to stop a driving unit that operates the kneading machine. Heat ray sensors or photoelectric sensors may be used as alternatives to electrostatic sensors. As an additional feature, case housing light projectors and photoelectric sensors are rotatably disposed above and near the gap between the two rollers, and a test reflector is disposed on the side of the case. When the rollers are stopped, a light receiving object switching circuit rotates the case and a test circuit tests the light receiving states of the photoelectric sensors.

6 Claims, 8 Drawing Sheets

SAFETY DEVICE FOR A KNEADING MACHINE USING ROLLS

BACKGROUND OF THE INVENTION

The invention relates to a safety device for stopping the operation of a kneading machine which is used for kneading a seal rubber material, when a hand of the worker or the like enters a hazardous region between two rolls.

When materials of two or more kinds are to be kneaded, a method is usually employed in which the materials are supplied into a gap between two rolls laterally juxtaposed. For a rubber material, particularly, a method in which various materials such as base rubber, a reinforcing material, and a vulcanizing agent are kneaded by rolls is widely employed. As shown in FIG. 12, in a kneading machine 11, two rolls 12 which are laterally juxtaposed are disposed so that their peripheral side faces are close to each other, and the rolls 12 are rotated in such a manner that movements of both of their opposing peripheral side faces are downward directed. The rolls 12 are disposed above a catch pan 24 on a pedestal 13, and their rotary shafts are rotatably supported at the end portions by side plates 15 which are upward projected from edge portions of the pedestal 13. As shown in FIG. 13, the shafts of the rolls 12 are coupled to a motor 17 through a transmission device 16, so as to be rotated. In this configuration, the one of the rolls 12 which is closer to the worker A in FIG. 12 is rotated faster than the other roll. An electric heater which is not shown is incorporated for heating in each of the rolls 12. A partition moving bar 18 elongates above the rolls 12 so as to pass through two partition plates 19 in such a manner that the plates can be slidably moved along the axial direction of the rolls 12. The positions of the partition plates 19 can be fixed by means of screws of grips 20, respectively.

The worker A who conducts the kneading work charges a rubber material B into which raw materials are mixed, into the space between the partition plates 19 from the top of the kneading machine 11. With the rotation of the rolls 12, thereafter, the rubber material B is downward transported through the gap between the rolls and then discharged toward the worker A along the peripheral face of the roll 12 which is closer to the worker and rotated faster. The worker A catches the discharged rubber material B by hands and again charges the material into the space between the partition plates 19 from the top of the machine. The rubber material B is kneaded by repeating the above-mentioned works. In order to knead the material uniformly and sufficiently, the worker A conducts the recharging work in the following manner. The discharged rubber material B is wound into a cylindrical shape and the cylindrical rubber material B is laterally recharged. Alternatively, the discharged rubber material B is severed with a knife and then the severed material is recharged. During the kneading work, the screws of the grips 20 are loosened and the distance between the partition plates 19 is adjusted as required.

Even in the case where the rubber material B is kneaded, the gap between the rolls 12 of the kneading machine 11 is as small as about several millimeters. When the rubber material is to be finally shaped into a thin sheet, the gap is set to be very small or about 1 mm. When a hand of the worker A excessively reaches the gap between the rolls 12 during the work of charging the rubber material B into the space between the partition plates 19 while carrying the rubber material by hands, therefore, there arises a danger that the hand is caught in the rotation and squeezed into the narrow gap.

To comply with this, as shown in FIG. 12, the conventional kneading machine 11 is configured so that a touch bar 31 is disposed above the rolls 12 or a microphone 32 is disposed. The touch bar 31 is connected to a safety device which detects an operation of the touch bar by means of a limit switch placed in the base and then interrupts the power supply of the motor 17. When a hand of the worker A is caught between the rolls 12, therefore, the worker can push or pull the touch bar 31 by the other hand, so that the rotation of the rolls 12 is immediately stopped. The microphone 32 is connected to a safety device which detects an input caused by a loud sound and then interrupts the power supply of the motor 17. When a hand of the worker A is caught between the rolls 12 and the worker screams, therefore, the rotation of the rolls 12 is immediately stopped in response to this.

In some cases, an emergency rope is stretched in place of the touch bar 31 and the rope is connected to a safety device which detects an operation of pulling the emergency rope and then interrupts the power supply of the motor 17.

The prior art safety devices are configured so as to immediately stop the rolls 12 in the case where the touch bar 31 or the like is operated when a hand of the worker A is caught and the worker fears danger or the hand is actually squeezed, or the case where the worker A screams when a hand is caught. The safety devices operate only to enable a countermeasure to be taken immediately before a serious accident happens or after such an accident occurs, and have a problem in that such devices cannot prevent an accident from occurring.

SUMMARY OF THE INVENTION

The invention has been conducted in view of the above-discussed problem. It is an object of the invention to provide a safety device for a kneading machine which detects by means of a sensor that a hand of the worker enters a hazardous region between rolls and immediately stops the rolls, thereby preventing an accident from occurring.

It is another object of the invention to provide a safety device for a kneading machine in which, during a safety period when rolls are stopped, a photoelectric sensor is caused to receive light of a specific property so as to be checked whether it normally operates or not, thereby enabling a fault of the photoelectric sensor to be previously found.

In order to attain the above-mentioned objects, the invention provides a safety device for a kneading machine having configuration ① in which two rolls laterally juxtaposed are disposed so that peripheral side faces of the rolls are close to each other and rotated in such a manner that movements of both of opposing peripheral side faces of the rolls are downward directed, thereby kneading a rubber material, and in which a sensor for detecting a physical quantity which is changed by entry of a hand of a worker into a region in the vicinity of a gap between the two rolls is disposed, and the device comprises: judging means for judging whether a change of the physical quantity detected by the sensor exceeds a predetermined range or not; and operation stopping means for, when the judging means judges that the change exceeds the predetermined range, stopping an operation of the kneading machine.

According to configuration ①, when a hand of the worker enters the region in the vicinity of the gap between the two rolls, the physical quantity detected by the sensor is changed, the judging means judges that the change exceeds the predetermined range, and the operation stopping means stops the operation of the kneading machine. When a hand of the worker is caused by careless handling or the like to excessively reach the gap between the rolls during the kneading work and there arises a danger that the hand is caught in the rotation, therefore, the rotation of the rolls is immediately stopped, thereby preventing an accident from occurring.

The invention provides a safety device for a kneading machine having configuration ②  in which an electrode is disposed above the gap between the two rolls and the sensor is an electrostatic capacitance sensor which detects an electrostatic capacitance between the electrode and an opposing conductor.

According to configuration ②, the electrostatic capacitance sensor mainly detects an electrostatic capacitance between the electrode and the two rolls. When the rubber material of a dielectric constant different from that of air exists between the electrode and the rolls, the electrostatic capacitance is changed. When a hand of the worker which can be deemed as a conductor enters this region, the electrostatic capacitance is largely changed. Therefore, the electrostatic capacitance sensor can function as a sensor which detects the electrostatic capacitance that is largely changed by entry of a hand of the worker, as a physical quantity. When the predetermined range of the judging means is adequately set, it is possible to distinguish a change of the electrostatic capacitance due to the rubber material from that due to entry of a hand of the worker.

The invention provides a safety device for a kneading machine having configuration ③ in which the sensor is a heat ray sensor for detecting heat rays which are radiated from the region in the vicinity of the gap between the two rolls.

According to configuration ③, the heat ray sensor detects heat rays (infrared rays) which are thermally radiated from a material existing in the region in the vicinity of the gap between the two rolls. The quantity and the spectrum distribution of the heat rays depend on the kind and the temperature of the material. In the case where the heating operation is conducted, the rubber material and the rolls have a temperature which is very higher than that of the hands of the worker, and, in the case where the heating operation is not conducted, have a temperature which is sufficiently lower than that of the hands of the worker. Heat rays radiated from a hand of a man are different in spectrum distribution from those radiated from the rubber material or the rolls. Therefore, the heat ray sensor can function as a sensor for detecting the quantity and the spectrum distribution of the heat rays which are changed by entry of a hand of the worker, as a physical quantity.

The invention provides a safety device for a kneading machine having configuration ④ in which the sensor is a reflection type photoelectric sensor for irradiating the region in the vicinity of the gap between the two rolls with only substantially linearly polarized light, and for receiving only substantially linearly polarized light from the region, the substantially linearly polarized light being different in polarization direction from the irradiation light, and the device comprises a reflection member which is to be attached to a hand or the like of a worker of the kneading machine and which reflects incident light with changing polarization direction of the light.

According to configuration ④, the photoelectric sensor emits only substantially linearly polarized light, and receives only substantially linearly polarized light which is different in polarization direction from the irradiation light. When the light emitted from the photoelectric sensor is reflected by the rubber material or the rolls, and the reflected light returns without being changed in polarization direction. Consequently, the light is little received by the sensor. By contrast, when the emitted light is reflected by the reflection member attached to a hand or the like of the worker, the polarization direction is changed. If the polarization direction coincides with that of the photoelectric sensor, the photoelectric sensor can receive the reflected light. Therefore, the photoelectric sensor can function as a sensor for detecting the quantity of received light which is changed by entry of a hand of the worker bearing the reflection member, as a physical quantity.

The invention provides a safety device for a kneading machine having configuration ⑤ in which the sensor is a photoelectric sensor for receiving only light of a specific wavelength range and from the region in the vicinity of the gap between the two rolls, and the device comprises a reflection member which is to be attached to a hand or the like of a worker of the kneading machine and which reflects only light of the specific wavelength range.

According to configuration ⑤, the photoelectric sensor receives only light of the specific wavelength range (specific color tone). The reflection member which is to be attached to a hand or the like of the worker reflects only light of the same specific wavelength range. When the specific wavelength range is set so as not to contain wavelength components which are mainly included in light obtained by reflecting illumination or natural light from the rubber material or the roll, therefore, the photoelectric sensor can receive the reflected light from the reflection member with distinguishing it from that from the rubber material or the roll. Consequently, the photoelectric sensor can function as a sensor for detecting the received light quantity which is changed by entry of a hand of the worker bearing the reflection member, as a physical quantity.

The invention provides a safety device for a kneading machine having configuration ⑥ in which two rolls laterally juxtaposed are disposed so that peripheral side faces of the rolls are close to each other and rotated in such a manner that movements of both of opposing peripheral side faces of the rolls are downward directed, thereby kneading a rubber material, and the device comprises: a light projector which irradiates at least a region in the vicinity of a gap between the two rolls; a detection reflection member which is to be attached to a hand or the like of a worker of the kneading machine, which receives light from the light projector, and which reflects only light of a specific property; photoelectric sensors in which a vicinity of the gap between the two rolls is set as a light receive object and which receive only light of the specific property from the light receive object; and emergency stopping means for, when at least one of the photoelectric sensors receives light of the specific property and a quantity which is not smaller than a predetermined quantity, stopping an operation of the kneading machine, and the device further comprises: a test reflection member which is disposed outside the vicinity of the gap between the two rolls, which receives light from the light projector, and which reflects only light of the specific property; a light receive object switching device which, in a suitable period during an interval when the rotation of the rolls is stopped, switches the light receive object of each of the photoelectric sensors to the test reflection member; and testing means for, in the period when the light receive object switching device switches the light receive object of each of the photoelectric sensors to the test reflection member, testing a light receiving state of each of the photoelectric sensors, and for, when a photoelectric sensor which does not receive light of the specific property and a quantity which is not smaller than the predetermined quantity is found, sending out a warning.

According to the safety device of configuration ⑥, when a hand of the worker enters the region in the vicinity of the gap between the two rolls, the detection reflection member attached to the hand of the worker receives light from the light projector and reflects only light of the specific property, the photoelectric sensors receive the light, and the emergency stopping means stops the operation of the kneading machine. When a hand of the worker is caused by careless handling or the like to excessively reach a hazardous region in the vicinity of the gap between the rolls during the kneading work and there arises a danger that the hand is caught in the rotation, therefore, the rotation of the rolls is immediately stopped, thereby preventing an accident from occurring.

During a safe period when the rotation of the rolls is stopped, the light receive object switching device conduct an operation such as that the orientation of each of the photoelectric sensors is changed, so as to switch the light receive objects of each of the photoelectric sensors to the test reflection member. Consequently, the test reflection member receives light from the light projector and reflects only light of the specific property, and the testing means tests a light receiving state of each of the photoelectric sensors. When any one of the photoelectric sensors is faulty and cannot receive light of the specific property, or when all the photoelectric sensor can receive light of the specific property but a detection circuit is faulty and cannot detect the reception of light, therefore, the testing means detects such a fault and sends out a warning to the worker, etc.

The invention provides a safety device for a kneading machine having configuration T in which two rolls laterally juxtaposed are disposed so that peripheral side faces of the rolls are close to each other and rotated in such a manner that movements of both of opposing peripheral side faces of the rolls are downward directed, thereby kneading a rubber material, and the device comprises: a light projector which irradiates at least an area in the vicinity of a gap between the two rolls; a detection reflection member which is to be attached to a hand or the like of a worker of the kneading machine, which receives light from the light projector, and which reflects only light of a specific property; photoelectric sensors which receive only light of the specific property from the vicinity of the gap between the two rolls; and emergency stopping means for, when at least one of the photoelectric sensors receives light of the specific property and a quantity which is not smaller than a predetermined quantity, stopping an operation of the kneading machine, and the device further comprises operation start restricting means for, in a suitable period during an interval when the rotation of the rolls is stopped, setting a state where the operation of the kneading machine is not started, and maintaining the restriction of the start of the operation until all the photoelectric sensors receive at least one time light of the specific property and a quantity which is not smaller than a predetermined quantity.

According to configuration ⑦, during a safe period when the rotation of the rolls is stopped, such as a period before the start of the kneading work, the operation start restricting means sets the kneading machine so as not to start the operation of the machine. The worker then conducts a checking operation such as that a hand bearing the detection reflection member is held in front of the photoelectric sensors. When all the photoelectric sensors receive light of the specific property from the detection reflection member, the operation start restricting means cancels the restriction of the start of the operation, with the result that the operation of the kneading machine can be started. When any one of the photoelectric sensors is faulty and cannot receive light of the specific property, or when all the photoelectric sensor can receive light of the specific property but a detection circuit is faulty and cannot detect the reception of light, therefore, the operation start restricting means does not cancel the restriction of the start of the operation, and hence it is possible to prevent a danger which may be caused by such a fault from arising. Furthermore, the photoelectric sensors are checked by using the actual detection reflection member. Also when the worker erroneously bears a wrong reflection member, or when the detection reflection member cannot reflect light of the specific property because of dirtiness or the like of the detection reflection member, the start of the operation can be inhibited.

The invention provides a safety device for a kneading machine having configuration ⑧ in which the detection reflection member of configuration ⑦ is disposed on a whole of an outer peripheral face of a wrist band attached to a worker of the kneading machine, receives light from the light projector, and reflects only light of the specific property, and the device comprises: a wrist band rotation supporting member onto which the wrist band on which the detection reflection member is disposed is fitted, and which rotates the wrist band; a test light projector which irradiates with light a partial region of the detection reflection member of the wrist band attached to the wrist band rotation supporting member; a test photoelectric sensor which receives only light of a specific property from the region of the detection reflection member illuminated by the test light projector; and second operation start restricting means for, in a suitable period during an interval when the rotation of the rolls is stopped, setting a state where the operation of the kneading machine is not started, for causing the wrist band rotation supporting member to make at least one turn, and for, unless the test photoelectric sensor continuously receives light of the specific property and a quantity which is not smaller than a predetermined quantity during a whole of a period when the wrist band rotation supporting member rotates, maintaining the restriction of the start of the operation irrespective of a state of the operation start restricting means.

According to configuration ⑧, when the wrist band is previously attached to the wrist band rotation supporting member, the whole periphery of the detection reflection member of the wrist band can be automatically checked, for example, before the start of the work. When even a part of the detection reflection member fails to reflect light because of dirtiness or the like, therefore, the start of the operation of the kneading machine can be inhibited. Consequently, the worker wears the wrist band after the safety of the detection reflection member is made sure, and conducts a checking work such as that the wrist band is held in front of the photoelectric sensors. Thereafter, the worker can start the operation of the kneading machine.

The invention provides a safety device for a kneading machine having configuration ⑨ in which the light projector of configuration ⑥ or ⑦ or the light projector and the test light projector of configuration ⑧ emit only substantially linearly polarized light, the detection reflection member and the test reflection member of configuration ⑥ or the detection reflection member of configuration ⑦ or ⑧ reflects incident light with changing polarization direction of the light, and the photoelectric sensors of configuration ⑥ or ⑦ or the photoelectric sensors and the test photoelectric sensor of configuration ⑧ receive only substantially linearly polarized light having a polarization direction obtained in the case where light from the light projector or the test light projector is reflected by the detection reflection member or the test reflection member.

According to configuration ⑨, when substantially linearly polarized light from the light projector is reflected by the rubber material, the rolls, or the like, the polarization direction is not changed, and hence the photoelectric sensors little receive the light. By contrast, when the light is reflected by the detection reflection member attached to a hand of the worker or the like, the polarization direction is changed, and hence the photoelectric sensors can receive the light. Therefore, the safety device can detect a hand of the worker or the like which enters the hazardous region in the vicinity of the gap between the rolls with surely distinguishing it from the rubber material or the roll.

DETAILED DESCRIPTION OF THE PREFERRED EMBODIMENTS

Hereinafter, specific embodiments of the invention will be described with reference to the accompanying drawings.

Figure 1:
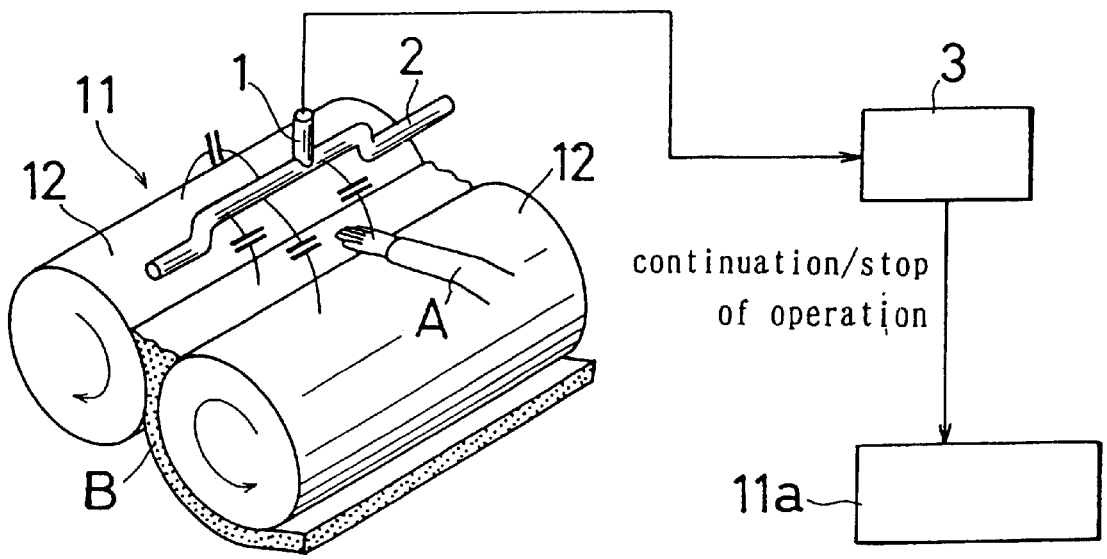
FIG. 1 is a block diagram showing a first embodiment of the safety device for a kneading machine of the invention.
Figure 12:
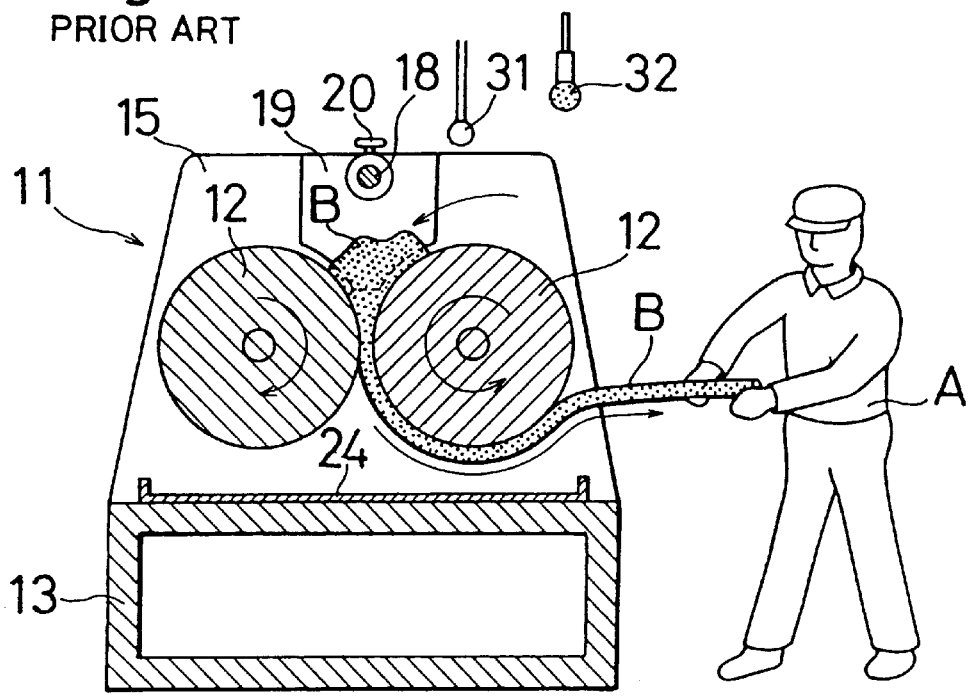
FIG. 12 is a sectional side view illustrating the structure of a prior art kneading machine.
Figure 13:
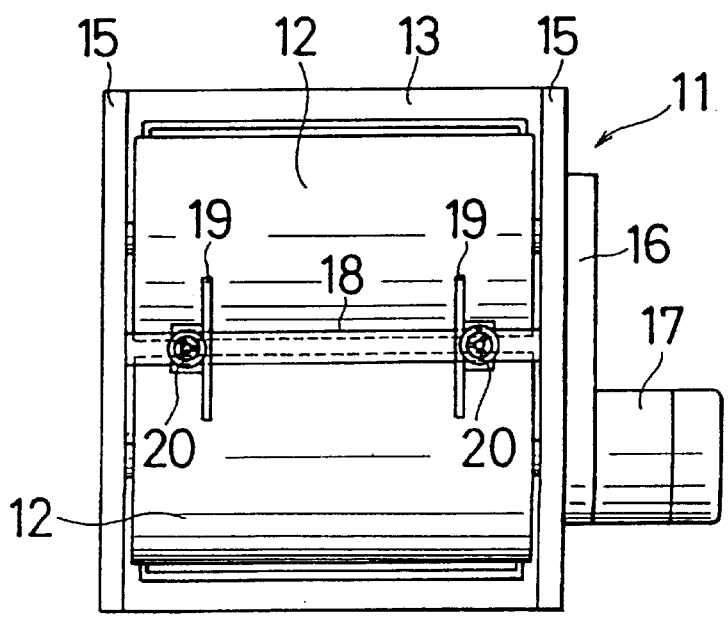
FIG. 13 is a plan view of the prior art kneading machine.

FIG. 1 is a block diagram showing a first embodiment of the safety device for a kneading machine of the invention. The members having the same functions as those of the prior art example shown in FIGS. 12 and 13 are designated by the same reference numerals and their description is omitted.

In the first embodiment, as shown in FIG. 1, an electrostatic capacitance sensor 1 is used as the sensor. As an electrode, a rod-like bar electrode 2 is attached to the electrostatic capacitance sensor 1. The bar electrode 2 elongates so that its longitudinal direction coincides with the axial direction of the rolls 12 of the kneading machine 11, and is located at a position which is above the rolls 12 and below the partition moving bar 18 shown in FIG. 12. The bar electrode 2 is bent into an adequate shape so as not to obstruct the work of kneading the rubber material B, thereby ensuring the main space above the gap between the rolls 12.

The electrostatic capacitance sensor 1 basically detects the electrostatic capacitance between the bar electrode 2 and the ground. Since the rolls 12 are made of an electrical conductor such as steel, however, the actual capacitance detected by the sensor is a synthesized capacitance of the series circuit of the electrostatic capacitance between the bar electrode 2 and the rolls 12 and that between the rolls 12 or the kneading machine 11 including the rolls and the ground. It can be deemed that the sensor substantially detects the electrostatic capacitance between the bar electrode 2 and the rolls 12. When the grounding circuit of the electrostatic capacitance sensor 1 is connected to the kneading machine 11 connected to the rolls 12, it is possible to directly detect the electrostatic capacitance between the bar electrode 2 and the rolls 12.

When a reference capacitor is connected in series to, for example, the bar electrode 2 and a constant voltage applied to these elements, the division potential of the bar electrode 2 changes depending on the variation of the electrostatic capacitance on the side of the bar electrode 2. In the electrostatic capacitance sensor 1, the potential is amplified by an operation amplifier and then output, whereby the electrostatic capacitance can be detected. In order to accurately measure the capacitance, any adequate countermeasure such as application of modification may be taken.

When the opposing area of electrodes is indicated by S, the distance between the electrodes is indicated by d, and the dielectric constant of a material between the electrodes is indicated by $\epsilon$, for example, the electrostatic capacitance C of a parallel-plate capacitor can be approximated by $$C = \epsilon S/d.$$

In the case where the rubber material B has not yet been charged into the kneading machine 11, only air exists between the bar electrode 2 and the rolls 12, and the opposing area S and the distance d are not changed. Consequently, the electrostatic capacitance detected by the electrostatic capacitance sensor 11 has a substantially constant value. By contrast, when the rubber material B of a dielectric constant $\epsilon$ which is higher than that of air is charged into a space above the gap between the rolls 12, the sensor detects the synthesized capacitance of the series circuit of the electrostatic capacitance of the portion where air exists and that of the portion where the rubber material B exists. Therefore, the detected electrostatic capacitance is increased in accordance with the quantity and the shape of the rubber material B. When a hand of the worker A which can be deemed as a conductor enters the space between the bar electrode 2 and the rolls 12, the distance d of the space can be reduced by the thickness of the hand of the worker A, and hence the detected electrostatic capacitance is increased in accordance with the state of the entry. As a result, as far as the dielectric constant $\epsilon$ of the rubber material B is not particularly high, the increase of the electrostatic capacitance due to the entry of the hand of the worker A is sufficiently larger in degree than that due to the charge of the rubber material B. When the worker A is grounded, the electrostatic capacitance sensor 1 detects the electrostatic capacitance between the bar electrode 2 and the hand of the worker A, and hence the increase of the electrostatic capacitance is more conspicuous.

The electrostatic capacitance detected by the electrostatic capacitance sensor 1 is supplied at any time to a judging circuit 3 which in turn judges whether the supplied value of the electrostatic capacitance exceeds a predetermined value or not. The predetermined value is set to be larger than the value of the increased electrostatic capacitance due to the charge of the rubber material B and smaller than the value of the increased electrostatic capacitance due to the entry of the hand of the worker A. The judging circuit 3 sends a control signal in accordance with a result of the judgment to a driving unit 11a of the kneading machine 11. Specifically, when it is judged that the electrostatic capacitance exceeds the predetermined value, a control signal instructing the operation of the kneading machine 11 to be stopped is sent to the driving unit 11a, and, when the electrostatic capacitance does not exceed the predetermined value, a control signal instructing the operation of the kneading machine 11 to be continued is sent. When the driving unit 11a receives the control signal instructing the continuation of the operation, the operation of the kneading machine 11 is continued as it is. By contrast, when the driving unit 11a receives the control signal instructing the stop of the operation, the rotation of the rolls 12 is immediately stopped and the operation of the kneading machine 11 is stopped. The main object of the stop of the operation is to immediately stop the rotation of the rolls 12. Therefore, the stopping process is not restricted to the interruption of the power of the motor 17 shown in FIG. 8, and includes also the interruption of the power transmission conducted by the transmission device 16. Alternatively, application of a braking force from a braking device may be performed in order to immediately stop the rotation of the rolls 12.

In the configuration described above, when a hand of the worker A enters a region in the vicinity of the gap between the rolls 12 during the kneading work of the kneading machine 11, the judging circuit 3 sends the control signal instructing the stop of the operation to the driving unit 11a. The region in the vicinity of the gap between the rolls 12 is a hazardous region where there is a danger that a hand is caught in the rotation of the rolls 12, and the worker A is not required to ,enter a hand during a usual work. Therefore, the entry of a hand in such a region is caused by careless handling or the like. When the driving unit 11a receives the control signal instructing the stop of the operation, the driving unit 11a immediately stops the rotation of the rolls 12. Therefore, the operation of the kneading machine 11 can be surely stopped before the hand of the worker is caught in the rotation of the rolls 12, thereby preventing an accident from occurring.

The worker A sometimes adjusts the distance between the partition plates 19 while loosening the screws of the grips 20 shown in FIGS. 12 and 13. During this adjustment operation, a hand of the worker enters the region above the gap between the rolls 12. In this case, however, the hand of the worker A is positioned above the bar electrode 2, and hence the entry of the hand exerts little influence on the electrostatic capacitance detected by the electrostatic capacitance sensor 1.

Figure 2:
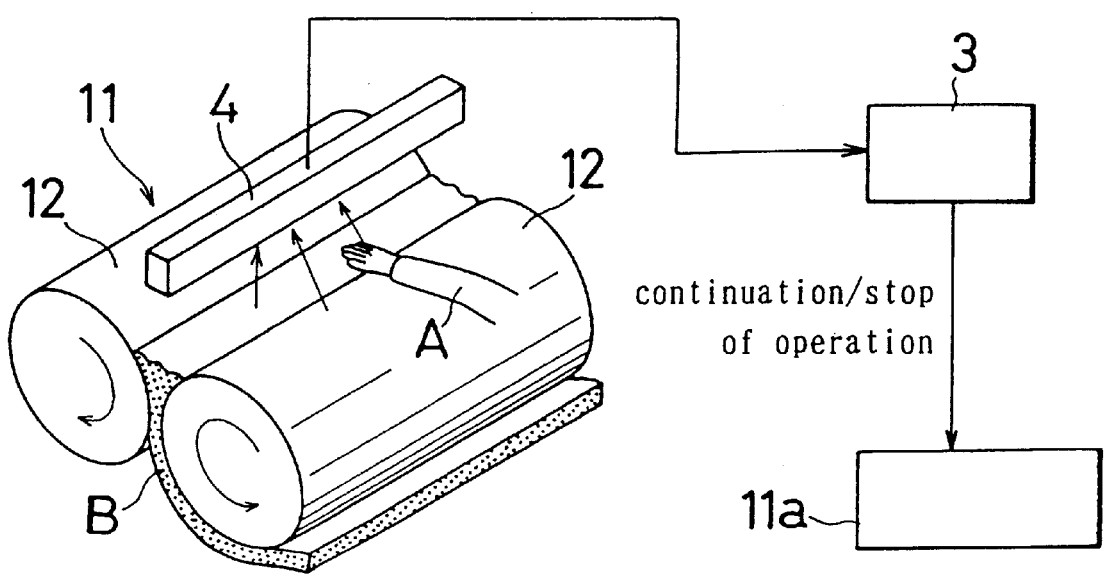
FIG. 2 is a block diagram showing a second embodiment of the safety device for a kneading machine of the invention.
Figure 3:
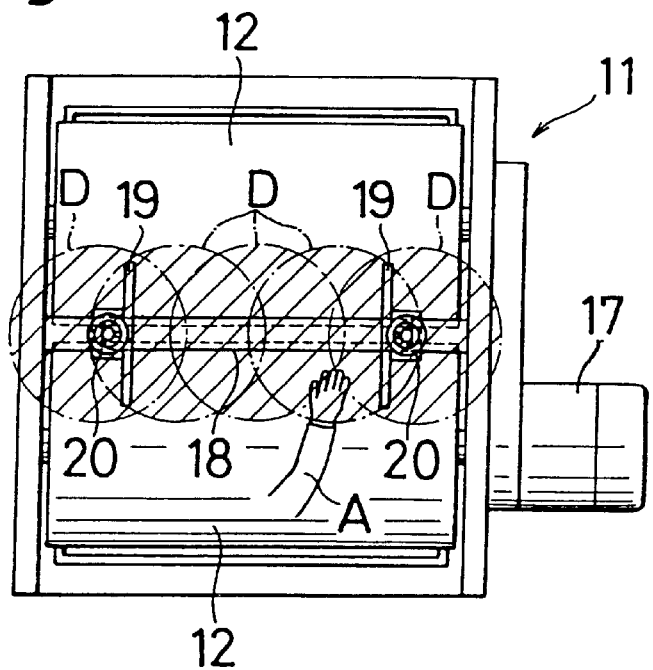
FIG. 3 is a plan view of the kneading machine showing the direction range of a photoelectric sensor in the second embodiment of the safety device for a kneading machine of the invention.

FIGS. 2 and 3 show a second embodiment of the invention. FIG. 2 is a block diagram showing the safety device for a kneading machine, and FIG. 3 is a plan view of the kneading machine. The members having the same functions as those of the prior art example shown in FIGS. 12 and 13 and the first embodiment shown in FIG. 1 are designated by the same reference numerals and their description is omitted.

In the second embodiment, as shown in FIG. 2, a heat ray sensor 4 is used as the sensor. The heat ray sensor 4 comprises light receiving devices which detect heat rays, and is disposed above the gap between the rolls 12 in the kneading machine 11 while downward orienting the light receiving direction. The heat ray sensor 4 has directional characteristics in which the sensor receives only heat rays radiated from the vicinity of the gap between the rolls 12. In the case where one light receiving device has a circular directional pattern, for example, plural light receiving devices are arranged in the axial direction of the rolls 12, and the circular directional patterns D are partially overlapped as shown by hatching in FIG. 3 so as to form a substantially elliptic directional pattern.

A material radiates heat rays by means of heat radiation. The quantity of the heat rays depends on the kind and the temperature of the material. The temperature of a hand of the worker A has a value in a certain range including 36° C. In the case where the rubber material B is kneaded with heating, the rubber material B and the rolls 12 have a temperature which is very higher than that of the hands of the worker A. In the case where the final shaping operation is conducted without heating, the rubber material B and the rolls 12 have a temperature which is sufficiently lower than that of the hands of the worker A. When a hand of the worker A enters the region in the vicinity of the rolls 12, therefore, the quantity of heat rays received by the heat ray sensor 4 is largely changed.

The value of the quantity of heat rays detected by the heat ray sensor 4 is supplied at any time to the judging circuit 3 which in turn judges whether the supplied value of the received heat ray quality exceeds a predetermined value or not. The judging circuit 3 sends a control signal in accordance with a result of the judgment to the driving unit 11a of the kneading machine 11. Specifically, in the case where the rubber material B is kneaded with heating, when it is judged that the quantity of the received heat rays exceeds the predetermined value, it can be judged that a hand of the worker A of a lower temperature enters the region. Therefore, a control signal instructing the operation of the kneading machine 11 to be stopped is sent to the driving unit 11a. When the quantity of the received heat rays does not exceed the predetermined value, a control signal instructing the operation to be continued is sent. In the case where the rubber material B is subjected to the final shaping process without heating, a control signal is sent in a manner opposite to the above. The operation of switching over the control signals may be automatically conducted in accordance with, for example, the ON/OFF state of the energization to the electric heaters of the rolls 12, or manually conducted by the worker A. In the same manner as the first embodiment, when the driving unit 11a receives the control signal instructing the continuation of the operation, the operation of the kneading machine 11 is continued as it is. By contrast, when the driving unit 11a receives the control signal instructing the stop of the operation, the rotation of the rolls 12 is immediately stopped and the operation of the kneading machine 11 is stopped. In the case where the heat ray sensor 4 is configured by plural light receiving devices as described above, the judging circuit 3 may separately conduct judgments which are respectively based on the quantities of heat rays received by the light receiving devices. In this case, it is possible to surely detect a local change of the quantity of heat rays which is caused by the entry of a hand of the worker A.

In the configuration described above, when a hand of the worker A is caused by careless handling or the like to enter the region in the vicinity of the gap between the rolls 12 during the kneading work of the kneading machine 11, the judging circuit 3 sends the control signal instructing the stop of the operation to the driving unit 11a, and the driving unit 11a immediately stops the rotation of the rolls 12. Therefore, the operation of the kneading machine 11 can be surely stopped before the hand of the worker A is caught in the rotation of the rolls 12, thereby preventing an accident from occurring.

Also the spectrum distribution of heat rays radiated by a material by means of heat radiation is largely changed in accordance with the kind and the temperature of the material. Heat rays radiated from a hand of a man are greatly different in spectrum distribution from those radiated from the rubber material B or the rolls 12. Therefore, the heat ray sensor 4 may be configured so as to measure the spectrum distribution or receive only heat rays of one or more specific wavelength ranges, thereby enabling the sensor to detect features of the spectrum distribution of heat rays changed by the entry of a hand of the worker A. In this case, the judging circuit 3 does not conduct a simple comparison of the received light quantity and a predetermined value, but, for example, judges from the various accounts a change of the received light quantity in each wavelength region, so that the entry of a hand of the worker A is surely judged.

In a configuration in which the heat ray sensor 4 is disposed above the partition moving bar 18, when the worker A adjusts the distance between the partition plates 19 while loosening the screws of the grips 20, a hand enters the directional pattern of the heat ray sensor 4. In this case, the hand of the worker A is at a position which is sufficiently higher than the gap between the rolls 12, and hence there arises no particular hazardous situation. In such a case, therefore, the safety device may be configured so that, during a period when, for example, a switch positioned at the base of the kneading machine 11 is operated, the driving unit 11a is inhibited from stopping the operation even when the control signal instructing the operation to be stopped is sent from the judging circuit 3. The worker A is requested to press the switch with a foot only when the partition plates 19 are to be adjusted, thereby preventing the machine from being unnecessarily stopped.

Figure 4:
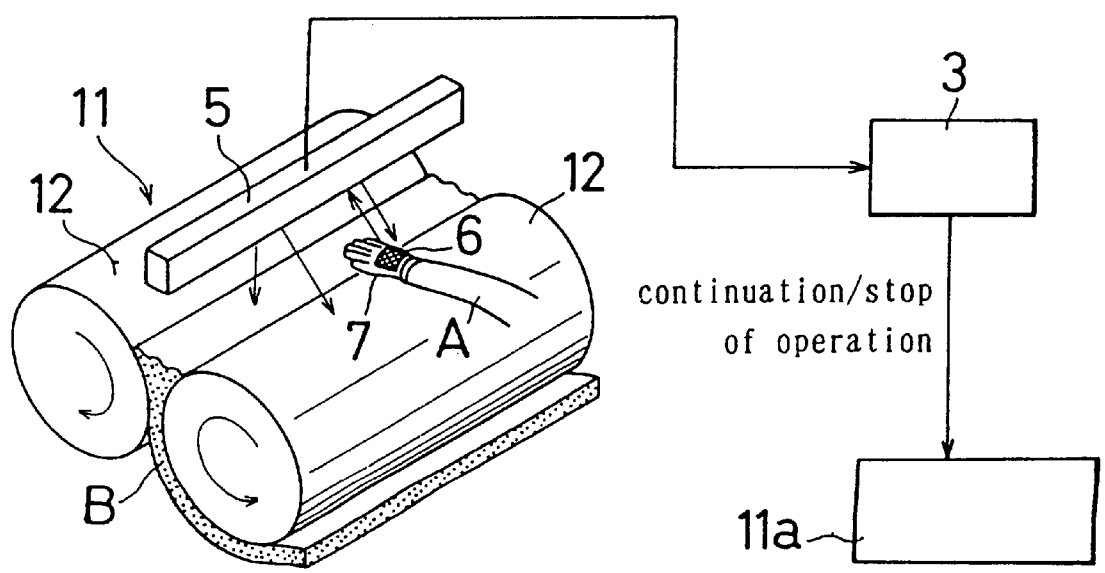
FIG. 4 is a block diagram showing a third embodiment of the safety device for a kneading machine of the invention.
Figure 5:
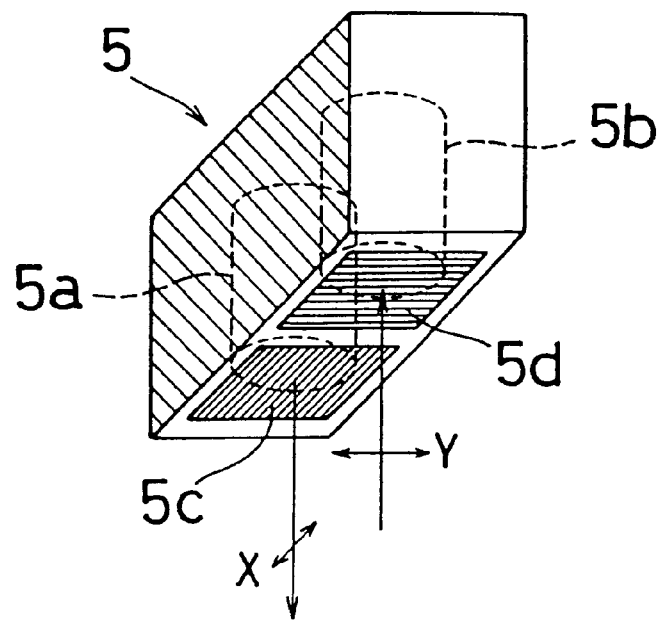
FIG. 5 is a perspective view partially in section showing the structure of a light projector and a photoelectric sensor in the third embodiment of the safety device for a kneading machine of the invention.
Figure 6:
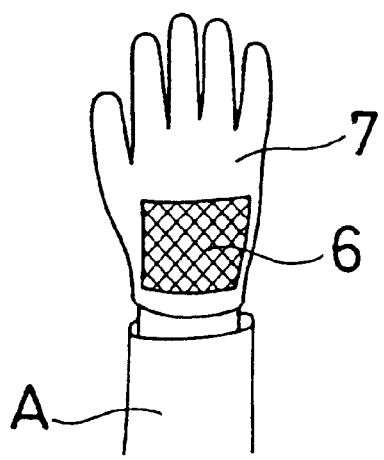
FIG. 6 is a plan view showing a reflection member sewn on a glove in the third embodiment of the safety device for a kneading machine of the invention.

FIGS. 4 to 6 show a third embodiment of the invention. FIG. 4 is a block diagram of the safety device for a kneading machine, FIG. 5 is a perspective view partially in section illustrating the structure of a photoelectric sensor, and FIG. 6 is a plan view showing a reflection member sewn on a glove. The members having the same functions as those of the prior art example shown in FIGS. 12 and 13 and the first embodiment shown in FIG. 1 are designated by the same reference numerals and their description is omitted.

In the embodiment, as shown in FIG. 4, plural light projectors 5a and plural photoelectric sensors 5b which are housed in a case 5 are used as the sensor.

As shown in FIG. 5, the photoelectric sensors 5b housed in the case 5 are sensors of the reflection type which receives light that is emitted from the light projectors 5a and then reflected by a body. The light projectors 5a and the photoelectric sensors 5b are arranged above the gap between the rolls 12 of the kneading machine 11 while downward orienting the projectors and the sensors. The photoelectric sensors 5b have directional characteristics restricted to the vicinity of the gap between the rolls 12, and the light projectors 5a illuminate a region including the directional pattern. In the case where each set of the light projector 5a and the photoelectric sensor 5b has a circular directional pattern, plural sets of the light projector 5a and the photoelectric sensor 5b are arranged in the axial direction of the rolls 12 in the same manner as the second embodiment shown in FIG. 3.

In the case 5, as shown in FIG. 5, a polarizing plate 5c which allows only light linearly polarized in the X-direction to pass therethrough is disposed in front of each light projector 5a, and a polarizing plate 5d which allows only light linearly polarized in the Y-direction perpendicular to the X-direction to pass therethrough is disposed in front of each photoelectric sensor 5b. When light emitted from the light projector 5a through the X-direction polarizing plate 5c is reflected by a usual body to return to the sensor, the polarization direction remains to be the X-direction, and hence the light cannot pass through the Y-direction polarizing plate 5d, with the result that the photoelectric sensor 5b cannot receive the light. The polarizing plates 5c and 5d may be configured by polarizers of another kind, as far as the polarizers function in the same manner.

When the photoelectric sensors 5b housed in the case 5 are used, the worker A must conduct the work while wearing gloves 7 in each of which a detection reflection member 6 is sewn on the portion corresponding to the back of a hand as shown in FIG. 6. In the detection reflection member 6, a number of minute concave reflecting faces are arranged on the surface and a quarter wave length plate is disposed on the reflecting faces. Reflecting faces return incident light to the incident direction at a high efficiency when the faces have a shape of an inverted circular cone of an apex angle of 90°. Even when reflecting faces have a curved concave shape, the reflecting faces surely return part of incident light to the incident direction. When the reflecting faces receive light from the light projectors 5a, therefore, the reflecting faces can reflect the light to surely return it toward the photoelectric sensors 5b irrespective of the orientation of the detection reflection member 6. The quarter wave length plate allows linearly polarized light to pass therethrough, and the light is then reflected by the reflecting faces in the back so as to again pass through the plate, with the result that the quarter wave length plate emits linearly polarized light in which the polarization direction is rotated by 90°. When the light projectors 5a emit light linearly polarized in the X-direction, therefore, light linearly polarized in the Y-direction is returned toward the photoelectric sensors 5b. Since the light linearly polarized in the Y-direction can pass through the polarizing plate 5d, the light is received by the photoelectric sensors 5b. The reflecting faces may be configured by minute convexes or a flat face for scattering reflected light, in place of the minute concaves. The quarter wave length plate may be replaced with an optical device of another kind, as far as it has the same function. Alternatively, an optical device having both the functions of the reflecting faces and the quarter wave length plate may be used.

The value of the quantity of light received by the photoelectric sensors 5b housed in the case 5 is supplied at any time to the judging circuit 3 which in turn judges whether the supplied value of the received light quantity exceeds a predetermined value or not. The judging circuit 3 sends a control signal in accordance with a result of the judgment to the driving unit 11a of the kneading machine 11. Specifically, when it is judged that the received light quantity light exceeds the predetermined value, a control signal instructing the operation of the kneading machine 11 to be stopped is sent to the driving unit 11a. When the received light quantity does not exceed the predetermined value, a control signal instructing the operation to be continued is sent. In the same manner as the first embodiment, when the driving unit 11a receives the control signal instructing the continuation of the operation, the operation of the kneading machine 11 is continued as it is. By contrast, when the driving unit 11a receives the control signal instructing the stop of the operation, the rotation of the rolls 12 is immediately stopped and the operation of the kneading machine 11 is stopped.

According to the configuration described above, during the usual kneading work of the kneading machine 11, light linearly polarized in the X-direction and emitted from the photoelectric sensors 5b housed in the case 5 is reflected only by the rolls 12, the rubber material B, etc. Therefore, the reflected light cannot pass through the polarizing plate 5d in which the polarization direction is the Y-direction, and only light which happens to have the Y-polarization direction among reflected light originated from external light passes through the polarizing plate, with the result that the quantity of light received by the photoelectric sensors 5b is very small. By contrast, when a hand of the worker A is caused by careless handling or the like to enter the region in the vicinity of the gap between the rolls 12, light emitted from the light projectors 5a is reflected by the detection reflection member 6 of the glove 7 attached to the hand of the worker A, so that the polarization direction is changed to the Y-direction and the light is surely returned toward the photoelectric sensors 5b. Therefore, the reflected light passes through the polarizing plate 5d and the quantity of light received by the photoelectric sensors 5b is increased. In response to the increase of the received light quantity, the judging circuit 3 sends a control signal instructing the operation of the kneading machine 11 to be stopped, to the driving unit 11a. The driving unit 11a immediately stops the rotation of the rolls 12. Therefore, the operation of the kneading machine 11 can be surely stopped before the hand of the worker A is caught in the rotation of the rolls 12, thereby preventing an accident from occurring.

In a configuration in which the case 5 housing the light projectors 5a and the photoelectric sensors 5b is disposed above the partition moving bar 18 shown in FIG. 12, when the worker A adjusts the distance between the partition plates 19 while loosening the screws of the grips 20, a hand enters the directional patterns of the photoelectric sensors 5b. In this case, the hand of the worker A is at a position which is sufficiently higher than the gap between the rolls 12, and hence there arises no particular hazardous situation. When sensors having a dead zone where light reception is inhibited are used as the photoelectric sensors 5b housed in the case 5 or a foot-operated switch is disposed in the same manner as the second embodiment, it is possible to prevent the machine from being unnecessarily stopped. In the third embodiment, the reflection member 6 is sewn on the glove 7. Alternatively, the reflection member may be formed into a wrist band-like shape so as to be directly attached to a wrist, or may be attached to a hand, a finger, a wrist, or the front portion of an arm of the worker A by an arbitrary method.

In the third embodiment, light reflected from the rolls 12 or the rubber material B is distinguished from that from the reflection member 6 attached to a hand of the worker A, on the basis of polarization of light. Alternatively, the photoelectric sensors 5b may be configured by light receiving devices for receiving only light of a color such as yellow or green which is little included in the wavelength components of light reflected from the rolls 12 or the rubber material B, and the detection reflection member 6 may be formed by a reflection tape or the like which reflects only light of the same color such as yellow or green or the glove 7 itself may be configured as the reflection member 6 and have a color such as yellow or green. Also in this case, light reflected from the rolls 12 or the rubber material B can be distinguished from that from the detection reflection member 6. In the alternative, the photoelectric sensors 5b may be sensitive only to light of a specific wavelength range, or a filter which allows only light of a specific wavelength range to pass therethrough may be disposed in front of usual light receiving devices.

In the embodiments described above, the judging circuit 3 sends a control signal instructing the operation to be stopped, on the basis of the physical quantity detected by the electrostatic capacitance sensor 1, the heat ray sensor 4, or the photoelectric sensors 5b. Alternatively, such a sensor may be used in combination with another sensor which is disposed at another position, and the judging circuit 3 may send a control signal instructing the operation to be stopped, only when the detection results of the sensors satisfy predetermined conditions.

In the third embodiment, when the photoelectric sensors 5b receive light of a specific polarization direction or a specific color, the photoelectric sensors 5b causes the safety device to operate. Even when a situation occurs in which the photoelectric sensors 5b cannot receive light because of a fault, therefore, it is impossible to distinguish this situation from the normal situation in which the photoelectric sensors do not receive light. In other words, in a safety device of a type in which abnormality is detected on the basis of reception of light in the photoelectric sensors 5b, the device cannot be configured so as to have a fail-safe structure in which, when a fault causes a photoelectric sensor which currently receives light to conduct the output in the same manner as the case where the sensor does not receive light, or when a fault occurs, the device operates in a safer manner. Usually, the hazardous region in vicinity of the gap between the rolls 12 has a slender shape elongating in the axial direction of the rolls 12, and many (for example, 16) photoelectric sensors are often laterally arranged in the region so that their directional patterns are partially overlapped. Even when only one of the photoelectric sensors is faulty, therefore, it is often that the abnormality cannot be promptly found.

Consequently, there may arise the case where the worker A starts the work without knowing the faulty state of the photoelectric sensors 5b. In such a case, even when a hand enters the hazardous region, the rotation of the rolls 12 is not stopped and hence an accident may not be prevented from occurring.

In the safety device for a kneading machine of the invention, fourth and fifth embodiments can solve this problem as described below.

Figure 7:
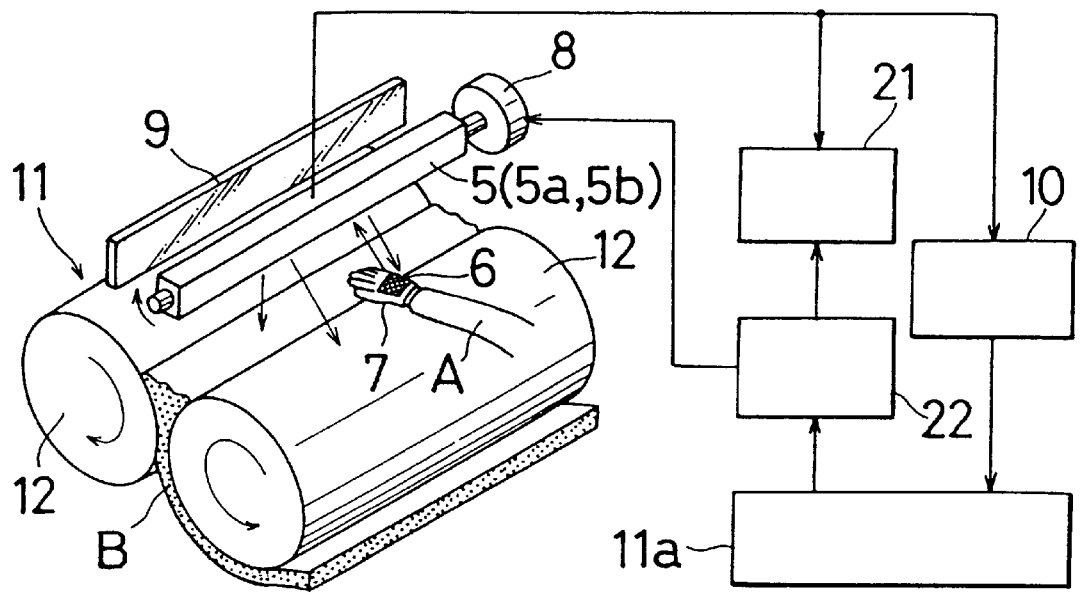
FIG. 7 is a block diagram showing a fourth embodiment of the safety device for a kneading machine of the invention.
Figure 8:
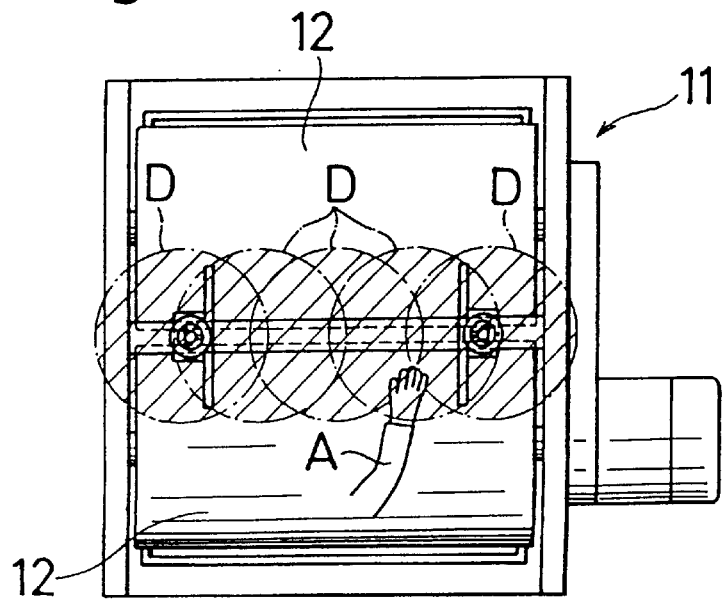
FIG. 8 is a plan view of the kneading machine showing the directional patterns of photoelectric sensors in the fourth embodiment of the safety device for a kneading machine of the invention.

FIGS. 7 and 8 show the fourth embodiment of the invention. FIG. 7 is a block diagram of a safety device for a kneading machine, and FIG. 8 is a plan view of the kneading machine showing the directional pattern of photoelectric sensors.

In the safety device for a kneading machine of the embodiment, photoelectric sensors are used for detecting the entry of a hand of the worker into the hazardous region on the basis of polarization of light.

As shown in FIG. 7, the light projectors 5a and the photoelectric sensors 5b of the safety device are arranged above the gap between the rolls 12 while being housed in the case 5. In the case 5, as shown in FIG. 5, pairs of the light projector 5a and the photoelectric sensor 5b are arranged with being downward oriented. As shown in FIG. 8, each photoelectric sensor 5b has a circular directional pattern D in the vicinity of the gap between the rolls 12 as indicated by hatching (in the same manner as FIG. 3). The plural photoelectric sensors 5b are arranged at adequate intervals in the case 5 so that the circular directional patterns D cover the slender region in the vicinity of the gap between the rolls 12 while the patterns are partially overlapped with each other. Also the light projectors 5a which are paired with the photoelectric sensors 5b are arranged at adequate intervals in the case 5 so as to respectively illuminate regions including the directional pattern D. FIG. 8 shows the case where five photoelectric sensors 5b are arranged. Actually, the length in the axial direction of the hazardous region in the vicinity of the gap between the rolls 12 is sufficiently longer than the width, and hence a larger number of (for example, 16) photoelectric sensors 5b are arranged. In the case where the directional pattern D of a single photoelectric sensor 5b can cover the whole of the region in the vicinity of the gap between the rolls 12, however, the single photoelectric sensor 5b may be sufficient for the device.

Also in the fourth embodiment, as shown in FIG. 5, the polarizing plate 5c which allows only light linearly polarized in the X-direction to pass therethrough is disposed in front of each light projector 5a, and the polarizing plate 5d which allows only light linearly polarized in the Y-direction perpendicular to the X-direction to pass therethrough is disposed in front of each photoelectric sensor 5b. When light emitted from the light projector 5a through the X-direction polarizing plate 5c is reflected by a usual body to return to the sensor, the polarization direction remains to be the X-direction, and hence the light cannot pass through the Y-direction polarizing plate 5d, with the result that the photoelectric sensor 5b cannot receive the light. The polarizing plates 5c and 5d may be configured by polarizers of another kind, as far as the polarizers function in the same manner.

As shown in FIG. 7, the case 5 which houses the light projectors 5a and the photoelectric sensors 5b are attached to a rotary solenoid B so that the case can be rotated by 90° about the rotation shaft which is parallel to the rolls 12. A test reflection member 9 which has a long plate-like shape and elongates substantially along the case 5 is disposed on the side to which the case 5 can be oriented by rotation. In the test reflection member 9, the side which opposes the case is formed as a mirror reflecting face and a quarter wave length plate is disposed in front of the reflecting face. The quarter wave length plate allows linearly polarized light to pass therethrough, and the light is then reflected by the reflecting face in the back so as to again pass through the plate, with the result that the quarter wave length plate emits linearly polarized light in which the polarization direction is rotated by 90°. When the case 5 is rotated and the light projectors 5a emit light linearly polarized in the X-direction, therefore, the test reflection member 9 returns light linearly polarized in the Y-direction to the photoelectric sensors 5b.

Also the safety device of the embodiment is configured so that the worker A conducts the work while wearing the gloves 7 in each of which the detection reflection member 6 is sewn on the portion corresponding to the back of a hand as shown in FIG. 6.

The reflecting face of the test reflection member 9 may be configured in the same manner as the reflecting faces of the detection reflection member 6. The reflecting faces may be configured by minute convexes or a flat face for scattering reflected light, in place of minute concaves. The quarter wave length plates of the test reflection member 9 and the detection reflection member 6 may be replaced with an optical device of another kind, as far as it has the same function. Alternatively, an optical device having both the functions of the reflecting faces and the quarter wave length plate may be used.

As shown in FIG. 7, signals of the received light quantity output from the photoelectric sensors 5b are supplied at any time to an emergency stopping circuit 10. When the value of the received light quantity indicated by the signal sent from at least one of the photoelectric sensors 5b exceeds a predetermined value, the emergency stopping circuit 10 supplies the operation stop signal to the driving unit 11a of the kneading machine 11. When the driving unit 11a receives the operation stop signal from the emergency stopping circuit 10, the rotation of the rolls 12 is immediately stopped and the operation of the kneading machine 11 is stopped.

The signals of the received light quantity output from the photoelectric sensors 5b are supplied at any time also to a test circuit 21. During a period when the rotation of the rolls 12 is stopped before the start of the machine or as a result of the operation of stopping the machine conducted by the worker A, the driving unit 11a supplies a roll stop signal to a light receive object switching circuit 22. The light receive object switching circuit 22 drives the rotary solenoid 8 so as to rotate the case 5 housing the light projectors 5a and the photoelectric sensors 5b by 90°, and supplies an operation enable signal to the test circuit 21, only during a period when the light receive object switching circuit receives the roll stop signal. The test circuit 21 checks the received light quantity supplied from the photoelectric sensors 5b to judge whether the quantity exceeds a predetermined value or not, only during a period when the circuit receives the operation enable signal. If the received light quantity from even one of the photoelectric sensors 5b fails to exceed the predetermined value, the test circuit sends out a warning. The warning may be realized by any means as far as the worker A, etc. can know a fault of the photoelectric sensors 5b. Usually, the warning is realized by means of lighting of a lamp or a sound of a buzzer. Alternatively, lamps which normally emit green light may be allocated to the photoelectric sensors 5b, and, when the test circuit 21 detects a fault, the lamp corresponding to the faulty photoelectric sensor 5b may be switched so as to emit red light. Preferably, the test circuit 21 supplies an operation stop signal which is not shown to the driving unit 11a at the same time with the issuance of the warning, thereby inhibiting the rotation of the rolls 12 even when the worker A instructs the machine to operate.

According to the configuration described above, during the usual kneading work of the kneading machine 11, light linearly polarized in the X-direction and emitted from the light projectors 5a is reflected only by the rolls 12, the rubber material B, etc. Therefore, the reflected light cannot pass through the Y-direction polarizing plate 5d and is not received by the photoelectric sensors 5b. In this case, light which happens to have the Y-polarization direction among reflected light originated from external light passes through the polarizing plate 5d. However, the quantity of light received by the photoelectric sensors 5b is so small that the light exerts little influence. By contrast, when a hand of the worker A is caused by careless handling or the like to enter the hazardous region in the vicinity of the gap between the rolls 12, light emitted from the light projectors 5a is reflected by the detection reflection member 6 of the glove 7 attached to the hand of the worker A, so that the polarization direction is changed to the Y-direction and the light is surely returned toward the photoelectric sensors 5b. Therefore, the reflected light passes through the polarizing plate 5d and the quantity of light received by the photoelectric sensors 5b is increased. In response to the increase of the quantity of the received light, the emergency stopping circuit 10 sends a control signal instructing the operation to be stopped, to the driving unit 11a. The driving unit 11a immediately stops the rotation of the rolls 12. Therefore, the operation of the kneading machine 11 can be surely stopped before the hand of the worker A is caught in the rotation of the rolls 12, thereby preventing an accident from occurring.

Before the start of the kneading machine 11 or when the worker A stops the operation of the machine during the work, the rotation of the rolls 12 is stopped. Even when a hand of the worker A enters the hazardous region in the vicinity of the gap between the rolls 12 during this period, there arises no particular hazardous situation. During the period when the rotation of the rolls 12 is stopped, the light receive object switching circuit 22 drives the rotary solenoid 8 so as to rotate the case 5 housing the light projectors 5a and the photoelectric sensors 5b by 90°, and the test circuit 21 starts the check of the received light quantity signals supplied from the photoelectric sensors 5b to judge whether the quantities exceed the predetermined value or not. Then, light from the light projectors 5a is reflected by the test reflection member 9, and the polarization direction of the reflected light is changed to the Y-direction and passes through the polarizing plate 5d. When each photoelectric sensor 5b is normal, the received light quantity is increased, and hence the test circuit 21 detects that the quantity of light received by the photoelectric sensor 5b exceeds the predetermined value. In the case where even one of the photoelectric sensors 5b is faulty or a detection circuit for one of the photoelectric sensors 5b is abnormal, the test circuit 21 detects that the quantity of light received by the photoelectric sensor 5b fails to exceed the predetermined value, and sends out a warning. Consequently, the worker A can know a fault of the photoelectric sensors 5b or the like from this warning and hence there arises no danger that the worker A starts the work without knowing the faulty state of the safety device and an accident is caused. In the embodiment, the photoelectric sensors 5b are checked before the start of the work or when the worker A stops the operation. It is not necessary to conduct the check in all periods when the rotation of the rolls 12 is stopped. The check may be conducted only before the start of the work.

In the embodiment, the case 5 is rotated by the rotary solenoid 8. Alternatively, the case may be rotated by another driving device or manually rotated. In the embodiment, the light projectors 5a and the photoelectric sensors 5b are oriented toward the test reflection member 9 by rotating the case 5. Alternatively, the optical paths of the light projectors 5a and the photoelectric sensors 5b may be guided to the test reflection member 9 by using mirrors and the like, or the test reflection member 9 itself may be moved so as to be positioned between the light projector 5a and the photoelectric sensors 5b, and the rolls 12. In the embodiment, plural pairs of the light projector 5a and the photoelectric sensor 5b are disposed. Alternatively, one or more light projectors 5a may be disposed independently from the photoelectric sensors 5b.

Figure 9:
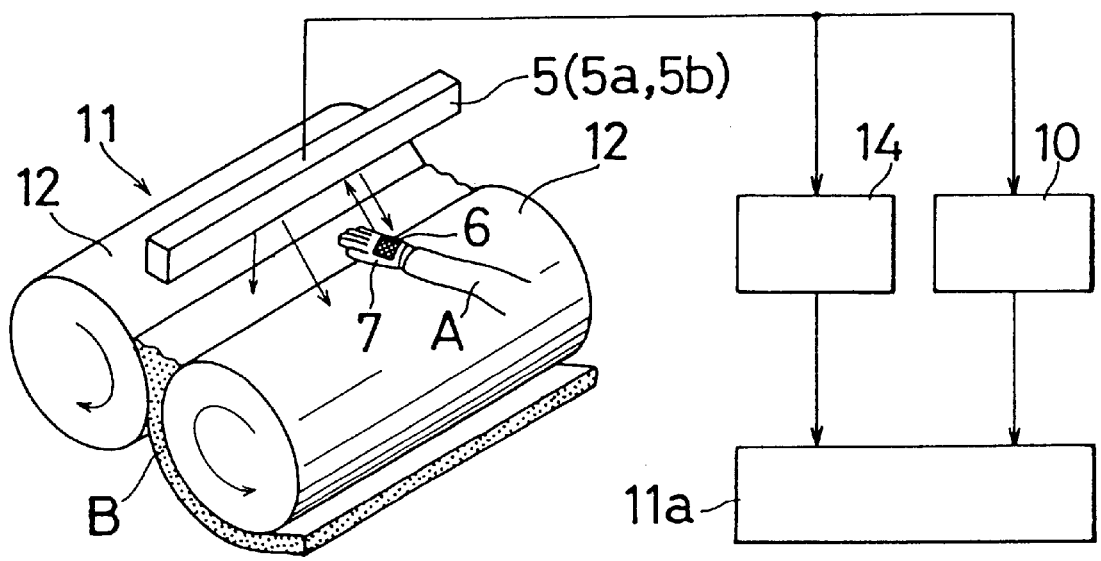
FIG. 9 is a block diagram showing a fifth embodiment of the safety device for a kneading machine of the invention.
Figure 10:
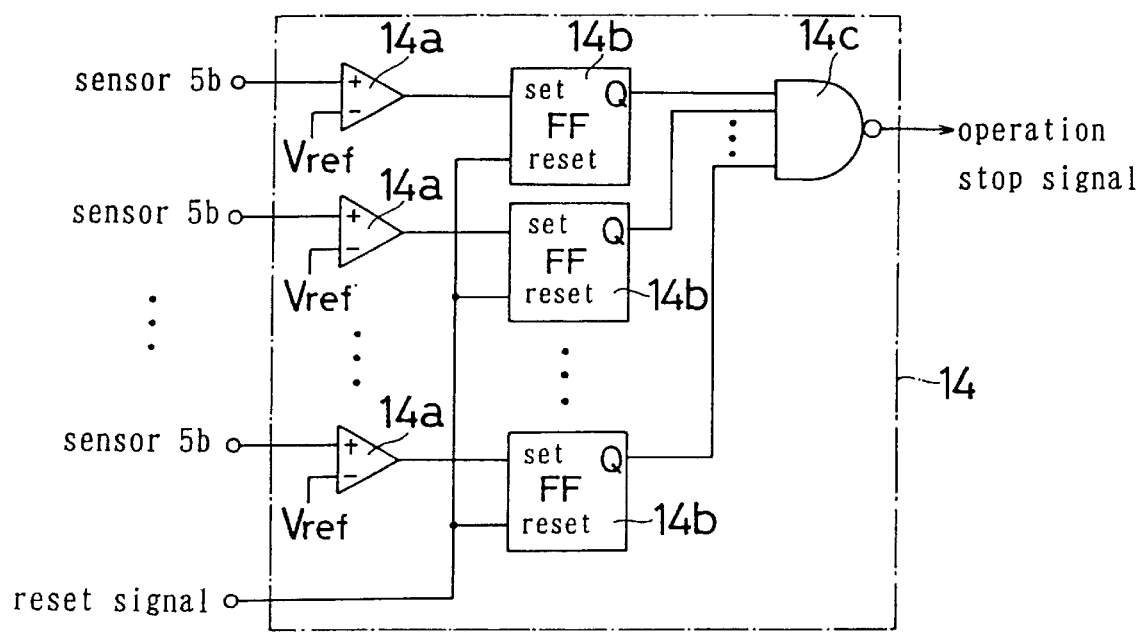
FIG. 10 is a block diagram showing the configuration of an operation start restricting circuit in the fifth embodiment of the safety device for a kneading machine of the invention.

FIGS. 9 and 10 show a fifth embodiment of the invention. FIG. 9 is a block diagram of a safety device for a kneading machine, and FIG. 10 is a block diagram showing the configuration of an operation start restricting circuit. The members having the same functions as those of the fourth embodiment shown in FIGS. 7 and 8 are designated by the same reference numerals and their description is omitted.

The safety device for a kneading machine of the embodiment is configured in a substantially same manner as the fourth embodiment. In the embodiment, however, the test reflection member 9 and the rotary solenoid 8 which are used in the fourth embodiment are not disposed, and the light receive object switching circuit 22 is not used. Therefore, the case 5 is not rotated, and the light projectors 5a and the photoelectric sensors 5b are always oriented to the hazardous region in the vicinity of the gap between the rolls 12. In place of the test circuit 21 used in the fourth embodiment, an operation start restricting circuit 14 which supplies the operation stop signal to the driving unit 11a is disposed.

The operation start restricting circuit 14 receives signals indicative of the received light quantity and output from the photoelectric sensors 5b. In the initial state after the power of the machine is turned on, the circuit always supplies the operation stop signal to the driving unit 11a. After the received light quantities of all the photoelectric sensors 5b once exceed a predetermined value, the circuit ceases the supply of the operation stop signal to the driving unit 11a.

FIG. 10 shows an example of the configuration of the operation start restricting circuit 14 which operates as described above. The signals of the received light quantity from the photoelectric sensors 5b are supplied to set terminals of RS flip-flop circuits 14b through comparators 14a, respectively. The comparators 14a are binarizing circuits for outputting a signal which has H level when the voltage of the signal indicative of the received light quantity of the corresponding the photoelectric sensor 5b exceeds a predetermined reference voltage Vref. A reset signal which has H level only one time after the power of the machine is turned on is supplied to the reset terminals of the RS flip-flop circuits 14b. The outputs Q of the RS flip-flop circuits 14b are supplied to a NAND circuit 14c. When the power of the machine is turned on, all the RS flip-flop circuits 14b are reset by the reset signal and their outputs Q are L level. Therefore, H level output from the NAND circuit 14c is supplied to the driving unit 11a as the operation stop signal. When the received light quantity of one of the photoelectric sensors 5b exceeds even one time the predetermined value, the RS flip-flop circuit 14b corresponding to the sensor is set and the output Q of the flip-flop circuit is thereafter maintained to H level. When all the RS flip-flop circuits 14b are set, therefore, the output of the NAND circuit 14c is switched to L level so that the supply of the operation stop signal is ceased.

A lamp may be provided for each of the RS flip-flop circuits 14b. When the corresponding flip-flop circuit 14b is reset, the lamp may be controlled so as to emit red light, and, when the circuit is set, switched so as to emit green light.

According to this configuration, immediately after the power of the kneading machine 11 is turned on, the operation start restricting circuit 14 continues to supply the operation stop signal to the driving unit 11a. Even when the worker A instructs the machine to operate, therefore, the operation cannot be started. By contrast, when the worker A conducts a checking work in which a hand bearing the glove 7 is held below the case 5 housing the light projectors 5a and the photoelectric sensors 5b and then moved along the case 5, the photoelectric sensors 5b sequentially receive light linearly polarized in the Y-direction and emitted from the detection reflection member 6. When the received light quantities of all the photoelectric sensors 5b exceed the predetermined value, the operation start restricting circuit 14 ceases the output of the operation stop signal. Then, the operation of the kneading machine 11 can be started in response to the operation instructions given by the worker A.

In the configuration in which the operation start restricting circuit 14 is provided with the lamps, immediately after the power of the kneading machine 11 is turned on, all the lamps emit red light, and, when the worker A holds a hand below the photoelectric sensors 5b, the lamps corresponding to the photoelectric sensors 5b are sequentially switched to emit green light. When all the lamps emit green light, the worker can know that the operation is enabled. The checking work by the worker A is executed in, for example, start-up inspection to be conducted every morning.

In the case where even one of the photoelectric sensors 5b is faulty or a detection circuit for one of the photoelectric sensors 5b is abnormal, therefore, the received light quantity fails to exceed the predetermined value even when the worker A holds a hand below the photoelectric sensor 5b, and the operation start restricting circuit 14 continues to output the operation stop signal. In the configuration in which the operation start restricting circuit 14 is provided with the lamps, only the lamp corresponding to the faulty photoelectric sensor 5b remains to emit red light. Consequently, there arises no danger that the worker A starts the work without knowing the faulty state of the safety device and an accident is caused. Unlike the fourth embodiment, the photoelectric sensors 5b are checked by using the detection reflection member 6 of the glove 7 which is actually attached to a hand of the worker A. Even when the worker A erroneously wears a wrong glove, or when the detection reflection member 6 cannot reflect light because of dirtiness or the like of the detection reflection member, it is possible to previously detect such a situation, so that the start of the operation is inhibited. In the embodiment, movable parts such as the rotatable case 5 used in the fourth embodiment are not required, and hence the safety device can be produced at a low cost.

In the embodiment, the photoelectric sensors 5b are checked only before the kneading work is started. The checking work may be conducted at any time during a period when the rotation of the rolls 12 is stopped. In the fourth and fifth embodiments, light reflected from the rolls 12 or the rubber material B is distinguished from that from the reflection member 6 attached to a hand of the worker A, on the basis of polarization of light. Alternatively, the photoelectric sensors 5b may be configured by light receiving devices for receiving only light of a color such as yellow or green which is little included in the wavelength components of light reflected from the rolls 12 or the rubber material B. In the alternative, the test reflection member 9 and the detection reflection member 6 used in the fourth embodiment, and the detection reflection member 6 used in the fifth embodiment may be formed by a reflection tape or the like which reflects only light of the same color such as yellow or green. Light receiving devices which are sensitive only to light of a specific wavelength range may be used as the photoelectric sensors 5b, or a filter which allows only light of a specific wavelength range to pass therethrough may be disposed in front of usual light receiving devices. In the fourth and fifth embodiments, the reflection member 6 is sewn on the glove 7. Alternatively, the glove 7 itself may be formed by the reflection member 6, the reflection member 6 may be formed into a wrist band-like shape so as to be directly attached to a wrist, or the reflection member 6 may be attached to a hand, a finger, a wrist, or the front portion of an arm of the worker A by an arbitrary method.

An example in which, in the fifth embodiment of the invention, the detection reflection member 6 is formed on the whole of the outer peripheral face of a wrist band and then attached to a wrist of the worker A will be considered.

Even in the case only a part of the whole periphery of the detection reflection member 6 becomes dirty and cannot reflect light, when the worker A holds a hand with orienting the face of the detection reflection member 6 which is not dirty toward the photoelectric sensors 5b, the operation start restricting circuit 14 ceases the output of the operation stop signal, thereby producing a danger that the operation of the kneading machine 11 can be started.

Figure 11:
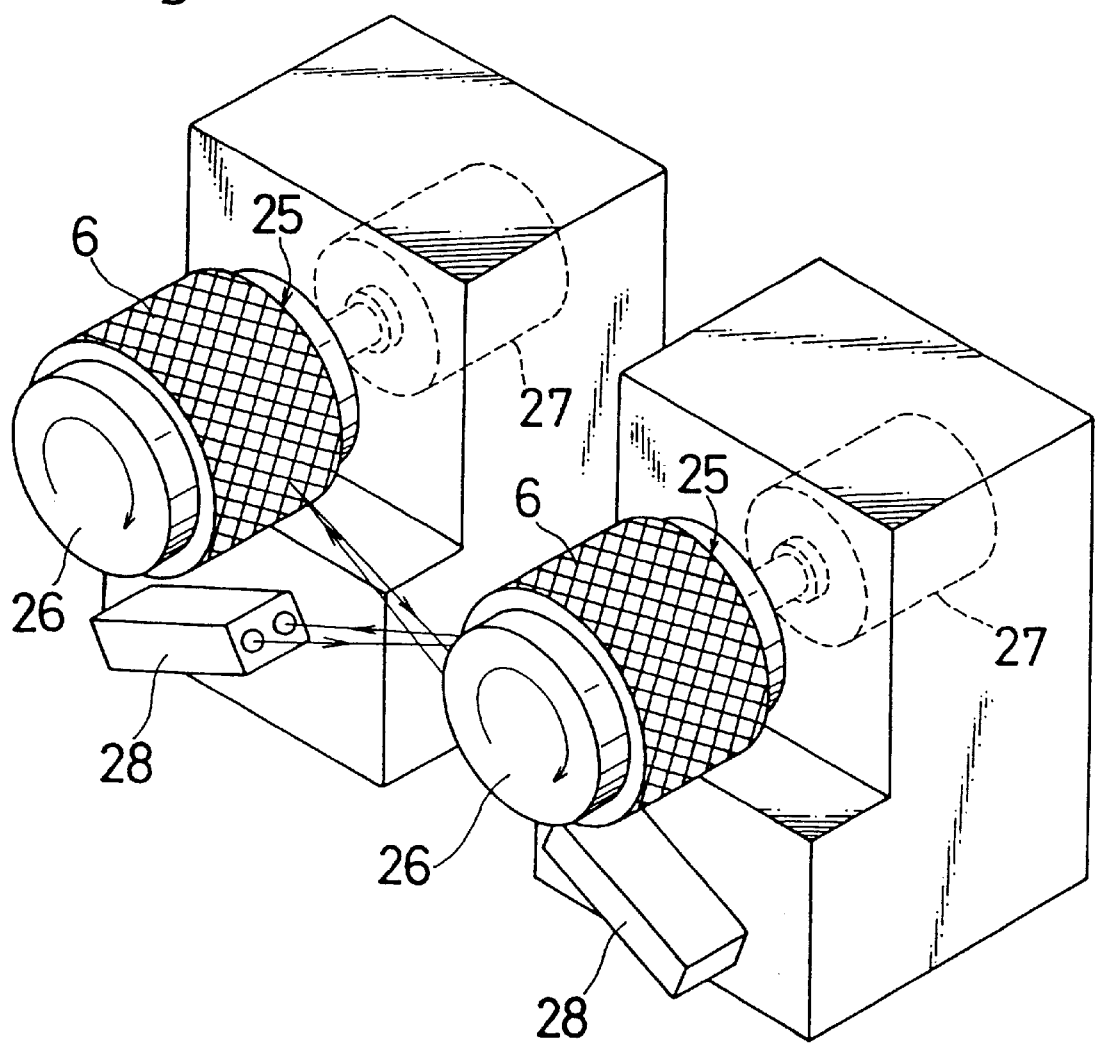
FIG. 11 is a perspective view of a checking device which checks dirtiness of a wrist band or the like in the case where the wrist band is used in the fifth embodiment of the safety device for a kneading machine of the invention.

To comply with this, as shown in FIG. 11, the safety device may be provided with a checking device which checks dirtiness or the like of the detection reflection member 6 disposed on a wrist band 25. The checking device comprises a pair of cylindrical supporting members 26. The wrist bans 25 are fitted onto the outer peripheries of the supporting members, respectively. The supporting members 26 are rotated by small motors 27. Test photoelectric detectors 28 are disposed below the supporting members 26, respectively. Each of the test photoelectric detectors consists of a set of the light projector 5a, the polarizing plate 5c, the photoelectric sensor 5b, and the polarizing plate 5d which are the same as those described above. Each test photoelectric detector 28 is configured so that the test light projector in the detector irradiates the detection reflection member 6 attached to the supporting member 26 on the opposite side, with light linearly polarized in the X-direction, and the test photoelectric sensor in the test photoelectric detector 28 receives only light linearly polarized in the Y-direction from a partial region of the detection reflection member 6. A control circuit which is not shown allows the small motors 27 to make one or more turns at a timing such as that when the power of the kneading machine 11 is turned on. When there arises a situation in which the received light quantities of the test photoelectric sensors in test photoelectric detectors 28 fail to have the predetermined value during the period when the supporting members 26 are rotated as a result of the rotation of the motors, the control circuit controls the operation start restricting circuit 14 so as not to cease the output of the operation stop signal.

Therefore, the worker A is requested to previously attach a pair of wrist bands 25 to the supporting members 26, so that the detection reflection members 6 of the wrist bands 25 can be checked at the same time when the power is turned on. When only a part of the whole periphery of one of the detection reflection members 6 fails to reflect light because of dirtiness or the like, a period when the received light quantity of the test photoelectric sensor in the corresponding test photoelectric detector 28 does not exceed the predetermined value is produced, and the operation start restricting circuit 14 is thereafter controlled so as not to cease the output of the operation stop signal. Therefore, it is possible to prevent a danger that the worker A uses a dirty detection reflection member 6 and the safety device does not operate, from occurring. By contrast, when the detection reflection members 6 are not dirty, the received light quantity of the test photoelectric sensor in the corresponding test photoelectric detector 28 remains to exceed the predetermined value during the rotation period of the supporting members 26, and hence the operation start restricting circuit 14 operates as usual. Consequently, the worker A detaches the wrist bands 25 from the supporting members 26 and wears the bands on the writs. Thereafter, the worker A holds either of the wrist bands, so that the output of the operation stop signal from the operation start restricting circuit 14 is ceased, with the result that the operation of the kneading machine 11 can be started.

As seen from the above description, according to the safety device for a kneading machine of the invention, a danger such as that a hand of the worker is caught in the rotation of rolls is previously detected and the operation of the kneading machine is stopped. Therefore, the invention can provide a working environment in which a serious accident is prevented from occurring and high safety is attained. Particularly, abnormality such as a fault of a photoelectric sensor can be detected automatically or in response to an operation of the worker before the start of the work or each time when the rotation of the rolls is stopped. Therefore, it is possible to prevent a situation that the worker starts the work without knowing a fault or a dirty state of the detection reflection member and an accident is caused, from arising.

What is claimed is:

1. A safety device for a kneading machine in which two laterally-juxtaposed rolls are disposed so that peripheral side faces of the rolls are close to each other and rotate in such a manner that movement of both of opposing peripheral side faces of the rolls are downward directed to thereby knead a rubber material, said safety device comprising:

a sensor, selected from a group consisting of a heat ray sensor and a photoelectric sensor, for detecting a physical quantity that is changed by entry of a hand of a worker into a region in the vicinity of a gap between the two rolls, wherein said sensor is a reflection-type sensor for irradiating the region in the vicinity of the gap between the two rolls with only substantially linearly-polarized irradiated light, and for receiving only substantially linearly-polarized received light from the region that is different in polarization direction from the irradiated light;

a reflection member adapted to be attached to a hand of a worker of the kneading machine, that reflects the irradiated light and changes the polarization direction of the irradiated light to the polarization of the received light;

judging means for judging whether a change of the physical quantity detected by said sensor exceeds a predetermined range; and operation stopping means for stopping operation of the kneading machine when said judging means judges that the change exceeds the predetermined range.

2. A safety device for a kneading machine in which two laterally-juxtaposed rolls are disposed so that peripheral side faces of the rolls are close to each other and rotate in such a manner that movement of both of opposing peripheral side faces of the rolls are downward directed to thereby knead a rubber material, said safety device comprising:

a sensor selected from a group consisting of a heat ray sensor and a photoelectric sensor, for detecting a physical quantity that is changed by entry of a hand of a worker into a region in the vicinity of a gap between the two rolls, wherein said sensor is a heat ray sensor for detecting heat rays that are radiated from the region in the vicinity of the gap between the two rolls;

judging means for judging whether a change of the physical quantity detected by said sensor exceeds a predetermined range; and operation stopping means for stopping operation of the kneading machine when said judging means judges that the change exceeds the predetermined range.

3. A safety device for a kneading machine in which two laterally-juxtaposed rolls are disposed so that peripheral side faces of the rolls are close to each other and rotate in such a manner that movement of both of opposing peripheral side faces of the rolls are downward directed to thereby knead a rubber material, said safety device comprising:

a light projector that irradiates at least a region in the vicinity of a gap between the two rolls;

a detection reflection member that is adapted to be attached to a worker's hand, that receives light from said light projector, and that reflects only light of a specific property;

photoelectric sensors in which a vicinity of the gap between the two rolls is set as a light receiving object and that receive only light of the specific property from the light receiving object;

emergency stopping means for stopping operation of the kneading machine when at least one of said photoelectric sensors receives light of the specific property and a quantity that is not smaller than a predetermined quantity;

a test reflection member that is disposed outside the vicinity of the gap between the two rolls, that receives light from said light projector, and that reflects only light of the specific property;

a light receiving object switching device that, in a suitable period during an interval when the rotation of the rolls is stopped, switches the light receiving object of each of said photoelectric sensors to said test reflection member; and testing means including:
1) means for, in the period when said light receiving object switching device switches the light receiving object of each of said photoelectric sensors to said test reflection member, testing a light receiving state of each of said photoelectric sensors, and
2) means for, when a photoelectric sensor that does not receive light of the specific property and a quantity that is not smaller than the predetermined quantity is found, sending out a warning.

4. A safety device for a kneading machine in which two laterally-juxtaposed rolls are disposed so that peripheral side faces of the rolls are close to each other and rotate in such a manner that movement of both of opposing peripheral side faces of the rolls are downward directed to thereby knead a rubber material, said safety device comprising:

a light projector that irradiates at least an area in the vicinity of a gap between the two rolls;

a detection reflection member that is adapted to be attached to a worker's hand, that receives light from said light projector, and that reflects only light of a specific property;

photoelectric sensors that receive only light of the specific property from the vicinity of the gap between the two rolls;

emergency stopping means for stopping operation of the kneading machine when at least one of said photoelectric sensors receives light of the specific property and a quantity that is not smaller than a predetermined quantity;

operation start restricting means for, in a suitable period during an interval when the rotation of the rolls is stopped, setting a state in which operation of the kneading machine is not started, and for maintaining the restriction of the start of operation until all said photoelectric sensors receive at least one time light of the specific property and a quantity that is not smaller than a predetermined quantity.

5. A safety device for a kneading machine according to claim 4, wherein said detection reflection member is disposed on a whole of an outer peripheral face of a wrist band attached to a worker of said kneading machine, receives light from said light projector, and reflects only light of the specific property, and said device further comprises:

a wrist band rotation supporting member onto which said wrist band on which said detection reflection member is disposed is fitted, and which rotates said wrist band;

a test light projector which irradiates with light a partial region of said detection reflection member of said wrist band attached to said wrist band rotation supporting member;

a test photoelectric sensor which receives only light of a specific property from the region of said detection reflection member illuminated by said test light projector; and second operation start restricting means for, in a suitable period during an interval when the rotation of said rolls is stopped, setting a state where the operation of said kneading machine is not started, for causing said wrist band rotation supporting member to make at least one turn, and for, unless said test photoelectric sensor continuously receives light of the specific property and a quantity which is not smaller than a predetermined quantity during a whole of a period when said wrist band rotation supporting member rotates, maintaining the restriction of the start of the operation irrespective of a state of said operation start restricting means.

6. A safety device for a kneading machine according to claim 4, wherein said light projector and test light projector emit only substantially linearly polarized light, said detection reflection member and said test reflection member reflects incident light with changing polarization direction of the light, and said photoelectric sensors and said test photoelectric sensor receive only substantially linearly polarized light having a polarization direction obtained in the case where light from said light projector or said test light projector is reflected by said detection reflection member or said test reflection member.

* * * * *